April 12, 1932.    A. A. HORTON    1,853,052
CALCULATING MACHINE
Original Filed Jan. 29, 1926    10 Sheets-Sheet 1

April 12, 1932. A. A. HORTON 1,853,052
CALCULATING MACHINE
Original Filed Jan. 29, 1926  10 Sheets-Sheet 2

INVENTOR
Allen A. Horton
BY
Rector, Hibben, Davis & Macauley
ATTORNEYS

April 12, 1932.　　A. A. HORTON　　1,853,052
CALCULATING MACHINE
Original Filed Jan. 29, 1926　　10 Sheets-Sheet 3

INVENTOR
Allen A. Horton
BY
Rector, Hibben, Davis, & Macauley
ATTORNEYS

April 12, 1932. A. A. HORTON 1,853,052
CALCULATING MACHINE
Original Filed Jan. 29, 1926 10 Sheets-Sheet 5

INVENTOR
Allen A. Horton
BY
Rector, Hibben, Davis, & Macauley
ATTORNEYS

April 12, 1932.  A. A. HORTON  1,853,052
CALCULATING MACHINE
Original Filed Jan. 29, 1926   10 Sheets-Sheet 6

INVENTOR
Allen A. Horton
BY
Rector, Hibben, Davis, & Macauley
ATTORNEYS

April 12, 1932.  A. A. HORTON  1,853,052
CALCULATING MACHINE
Original Filed Jan. 29, 1926   10 Sheets-Sheet 7

INVENTOR
Allen A Horton
BY
Rector, Hibben, Davis, & Macauley
ATTORNEYS

April 12, 1932.   A. A. HORTON   1,853,052
CALCULATING MACHINE
Original Filed Jan. 29, 1926   10 Sheets-Sheet 8

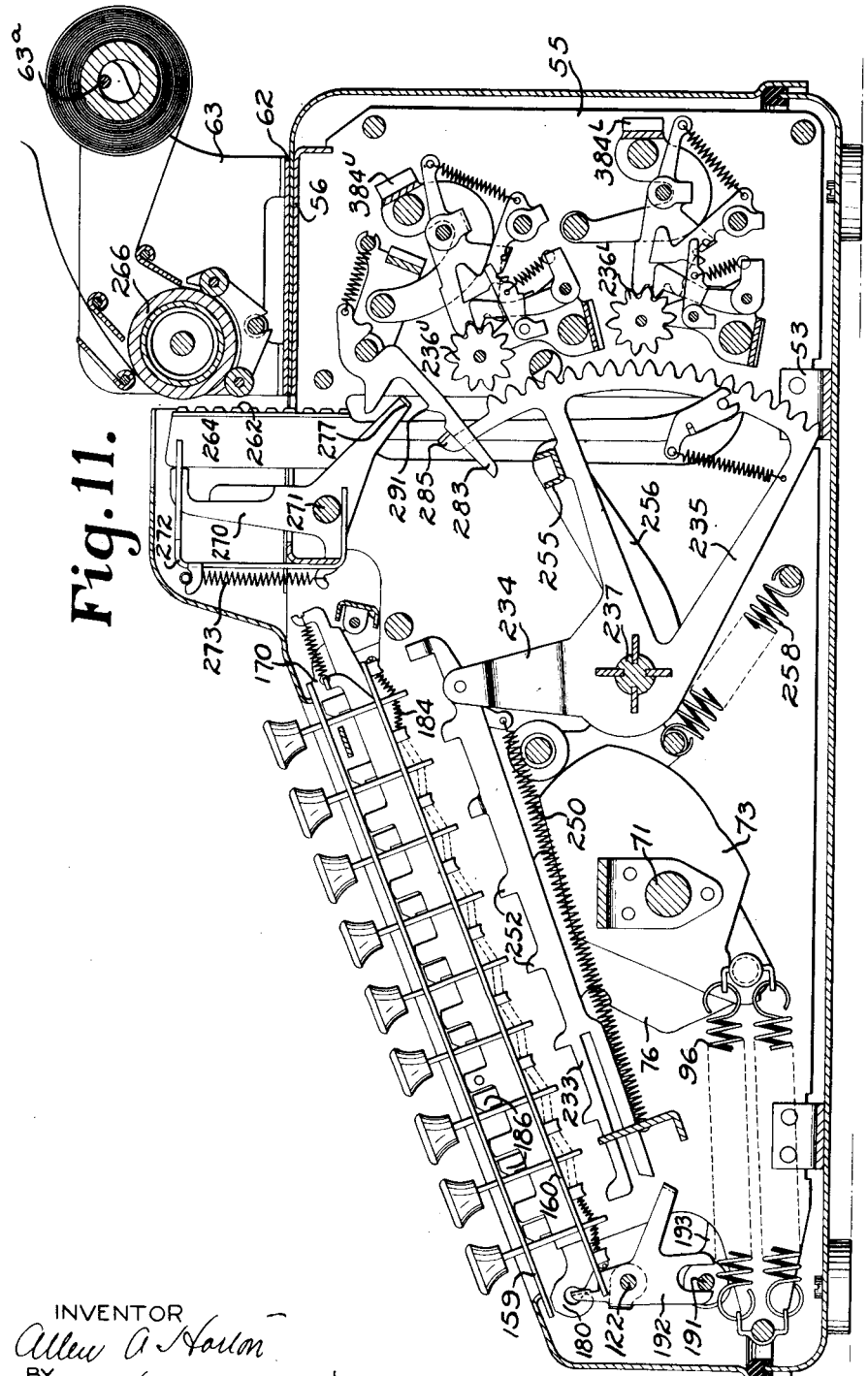

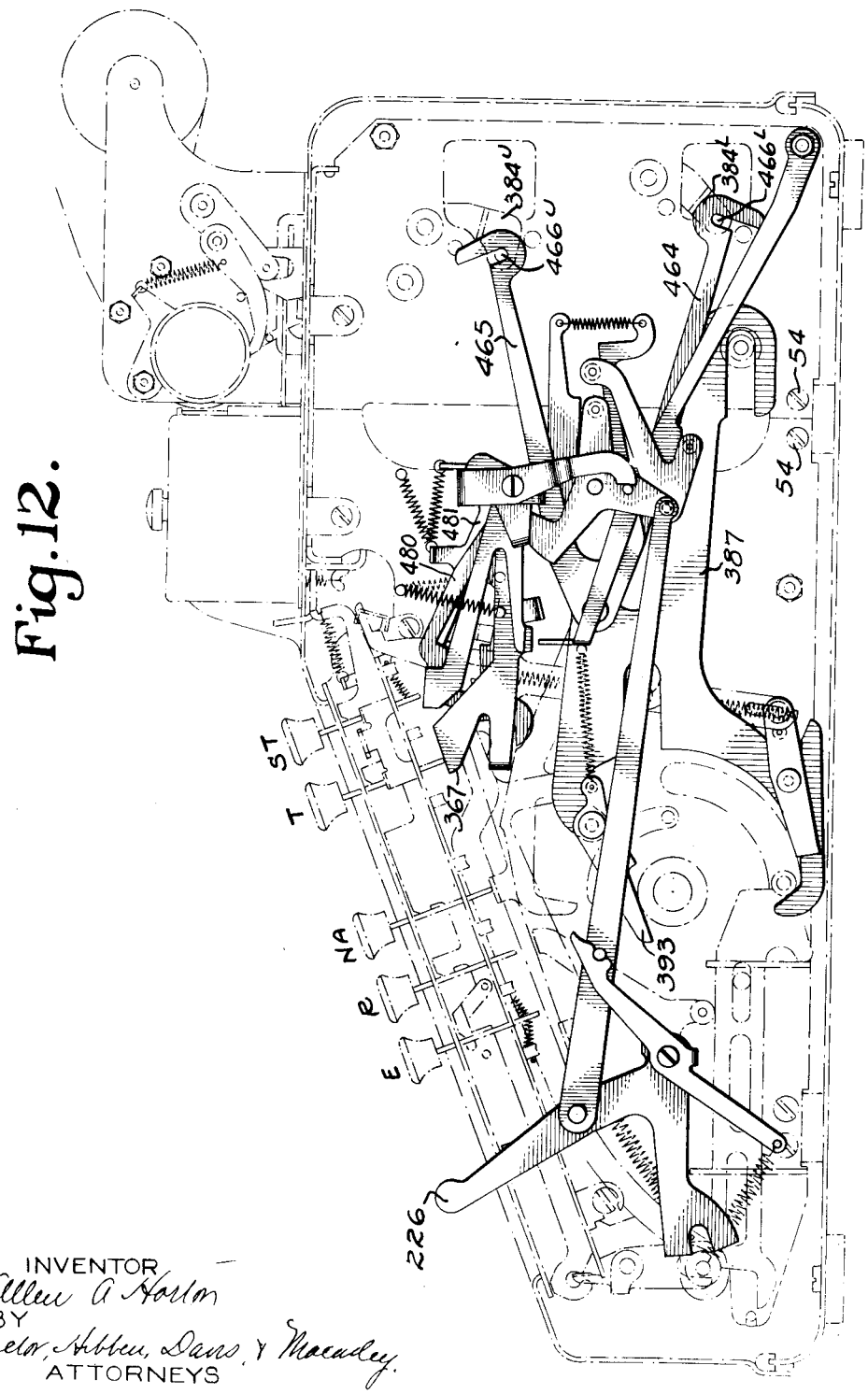

Patented Apr. 12, 1932

1,853,052

UNITED STATES PATENT OFFICE

ALLEN A. HORTON, OF PLYMOUTH, MICHIGAN, ASSIGNOR TO BURROUGHS ADDING MACHINE COMPANY, OF DETROIT, MICHIGAN, A CORPORATION OF MICHIGAN

CALCULATING MACHINE

Original application filed January 29, 1926, Serial No. 84,616. Divided and this application filed May 14, 1927. Serial No. 191,338.

This invention relates to a calculating machine of the type that will accumulate successive items, print them and the total and sub-total thereof, subtract when desired, and perform certain other functions hereinafter described.

The present application, which is a division of my copending application, Serial No. 84,616, filed January 29, 1926, relates particularly to the construction and the method of making a calculating machine so that a machine capable of certain functions, as, for example, addition, may be quickly and easily converted into one having other functions, as, for example, addition and subtraction, or duplex or multiple counter addition. The invention facilitates production, reduces manufacturing cost, and reduces the expense of maintaining large inventories of different types of machines and repair parts.

In order that the object and the nature of the invention may be more clearly understood, brief reference will be made to the construction of present day machines. These machines are complicated mechanical devices comprising a large number of intricate parts interconnected with one another and all cooperating toward achieving results which are functions of the whole machine, namely, the accumulation of items, the printing of them, totaling and sub-totaling, subtraction, etc. Some machines will add only, others will add and subtract and still others will multiply and divide, but in each case the machine constitutes an intricate organization of interwoven mechanisms which comprises a single unit, that is, each machine is assembled as a whole for performing only certain functions, and it is impossible to convert a machine primarily intended to perform certain functions into a machine adapted to perform other functions. For example, the standard Burroughs adding machine is a unit in itself. A machine of the same general type is built that is capable of subtracting as well as adding, but the latter comprises a different organization of elements and it is built as an individual machine which cannot be changed without disassembling and rebuilding with additions and changes in various parts, which, in effect, constitutes building a new machine. This means that the user, having once purchased a machine that will add only, cannot obtain a machine that will both add and subtract without purchasing an entirely new one even though the new machine may have a large number of parts that are the same as those in the old one.

The present invention has been devised with the object in view of making a machine in such a way that it may be readily converted from a machine performing certain functions, as for example, addition, to a machine performing other functions, as for example, addition and subtraction by simply disconnecting a readily detachable section of the machine and substituting another while continuing to use the main portion of the mechanism. In achieving this result a new type of machine has been developed which is built in sections constituting independent units that may be assembled together in different combinations to produce machines having different characteristics. These sections each contain certain groups of mechanisms which have been carefully chosen and associated so that each section comprises an independent unit. In addition, the mechanisms are so constructed and located in the sections that when the sections are placed together the different mechanisms of each section are in position to cooperate with the mechanisms of the other sections to permit all of them to function together as a complete calculating machine.

The construction of the machine is also such that the functions of the machine may be changed by changing one section, that is, by quickly disconnecting one section and substituting another having different mechanisms, but, although the new section has different mechanisms, the remainder of the machine functions with it to give the new characteristics. This requires a construction for the main body of the machine that will function with the different sections that may be connected to it for changing its characteristics. In other words, it is only through the novel construction, arrangement and combination of parts herein disclosed that the above results can be accomplished.

The general object of the invention, is therefore, to provide a new type of calculating machine that may be built in independent sections which may be assembled together without tedious interconnection of parts and particularly one in which one or more of the sections may be readily changed to change the functions of the machine without requiring that it be disassembled and rebuilt.

It is also an object of the invention to accomplish the above results in the simplest manner possible with the fewest number of parts and in such a way that the resulting machine will be a light, compact, portable machine that can be enclosed in a small casing and set on any convenient piece of office furniture such as a desk.

Other objects and advantages of the invention will hereinafter appear.

An embodiment of the invention is shown in the accompanying drawings in which:—

Fig. 11 is a sectional side elevation of the machine showing the duplex totalizer section connected in position.

Fig. 12 is a side elevation of the machine in dotted lines with the duplex totalizer section connected in position and showing the controls in full line on the outside of the machine.

The machine is built in units or sections which, generally speaking, comprise a main or operating unit including the operating devices, the actuator racks, and the differential stop bars; a keyboard section including banks of amount and control keys with latches and associated parts; a printing section including certain of the printing mechanisms; a paper and ribbon section including a platen and ribbon reels and operating mechanism for both; and different totalizer sections including totalizers with suitable transfer mechanisms therefor. Each of these sections will be described separately after which the manner of assembling them will be explained. A description of all the details and of the operation of all the parts of the machine is contained in said parent application.

*Operating section*

Figure 2:
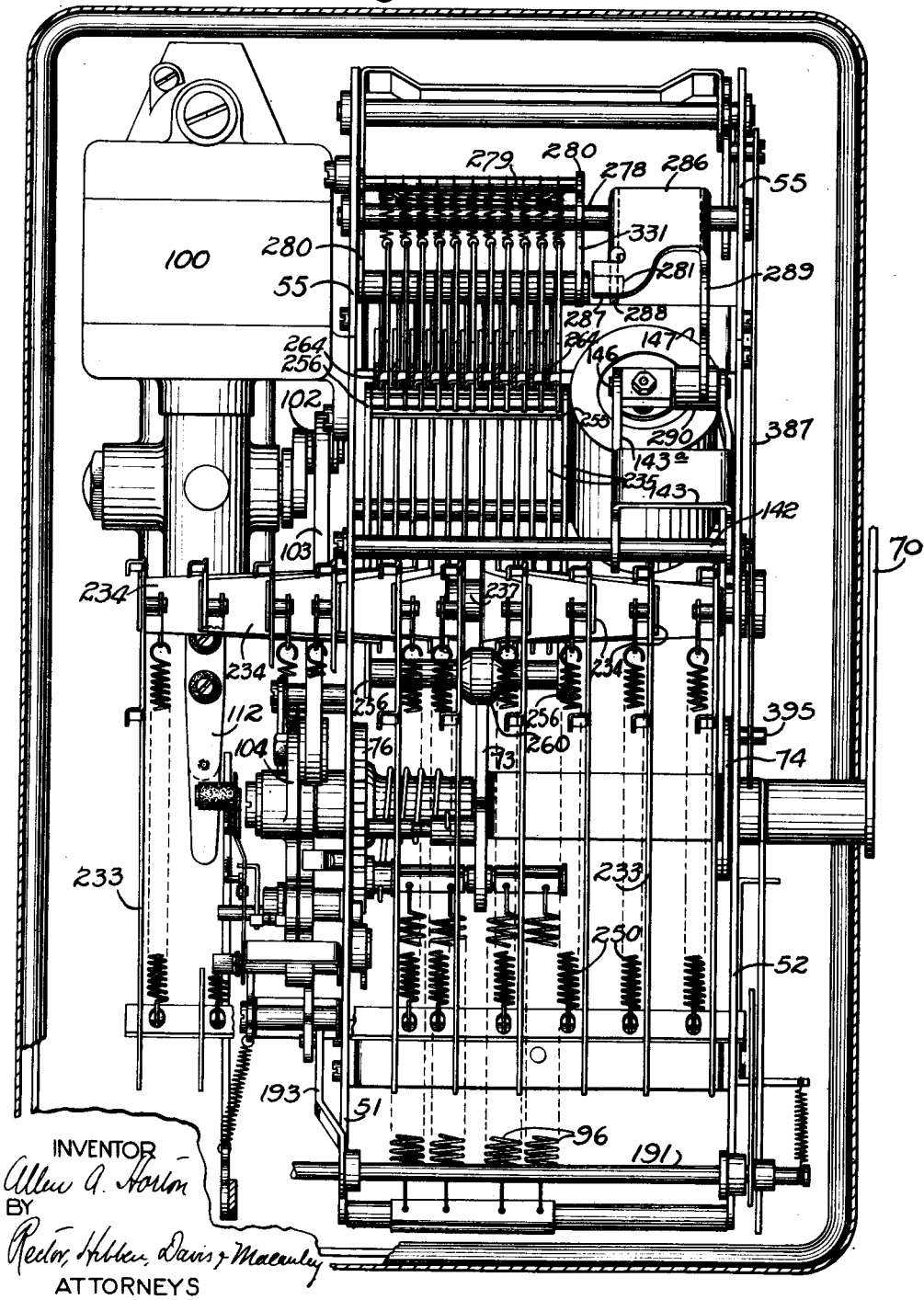
Fig. 2 is a plan view with the casing removed.
Figure 3:
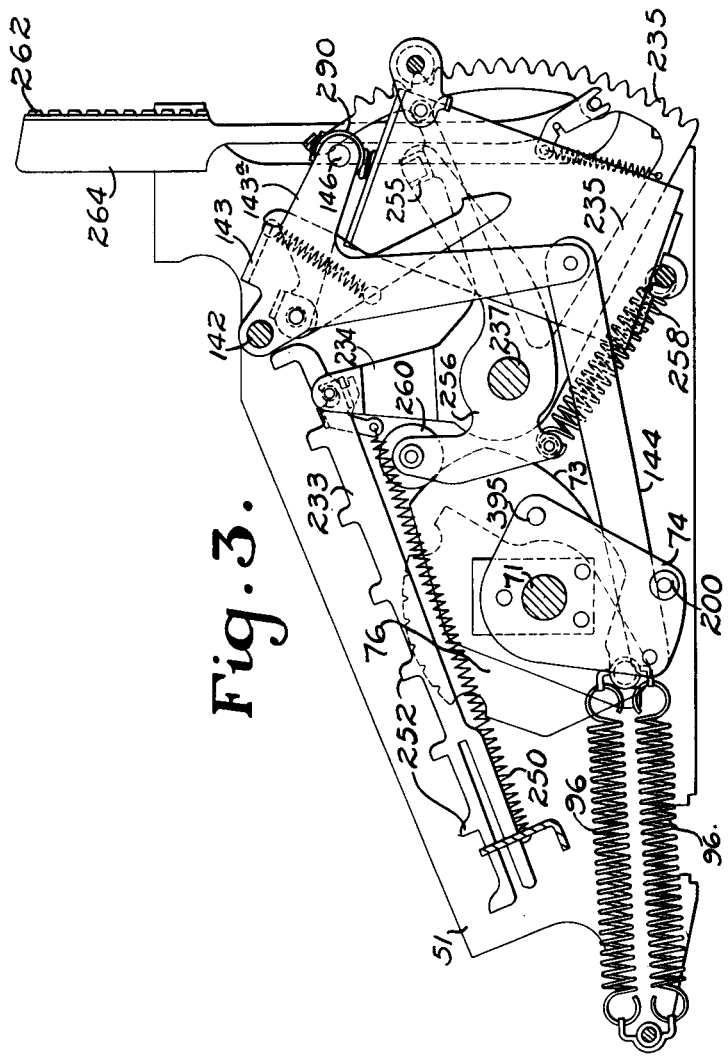
Fig. 3 is a side elevation and section of the main operating unit.

The main section of the machine is the operating section which contains the operating mechanism including the actuators and the stop bars. This section is best illustrated in Figs. 2 and 3. It is a relatively narrow unit having two side plates 51 and 52 in which is journaled a main operating shaft 71 that may be given a forward and a return stroke of movement by a handle 70 or by a motor 100, both of which are illustrated in Fig. 2. Restoring springs 96 assist in returning the shaft to normal position after it has been given a forward stroke by the handle or the motor. The shaft 71 is provided with a full stroke section 76, a restoring cam 73 for controlling the bail that restores the actuator racks, and a driving plate 74 having studs 200 and 395 for controlling the moving of the totalizers or counters into and out of engagement with the actuators as will be hereinafter explained.

Pivoted on a shaft 237 carried by the side plates 51 and 52 are a series of segmental actuator racks 235. Each of the actuators has an upwardly extending arm 234 connected to its respective stop bar 233 provided with a plurality of differentially positioned stops 252 which are adapted to engage the stems of amount keys that may be positioned in their paths. The stop bars are normally urged forward by springs 250 and in this manner the actuators are normally urged counter-clockwise. These actuators are prevented from moving counter-clockwise by the cross bar 255 of a restoring bail having arms 256 pivoted on the shaft 237. The opposite ends of these arms carry a cam roller 260 bearing against the edge of the cam 73. When the operating shaft 71 is given a forward stroke of movement, the cam 73 moves so as to release the roller 260 to permit the bail 255 to move away from the actuators to free them to permit them to move to differential positions under the action of the springs 250. During the return stroke the bail picks up all the moved actuators and restores them to normal position.

The driving disk 74 has connected to it one end of a link 144 whose other end is connected to the downwardly extending arm of a yoke 143 pivoted on a shaft 142 carried by the side plates of the section. This yoke has a pair of rearwardly extending arms 143ª in the outer ends of which is journaled a shaft 146. This shaft is connected to the dash pot 147 (Fig. 2) to operate it and it also carries a cam roller 290 for operating the mechanism of the printing devices and of the paper and ribbon feeding unit as will be later explained.

Connected to each of the actuator segments is a type bar 264 which moves with the segment to position the proper printing type 262 in front of a platen 266 illustrated in Fig. 11. The type bar at the right hand side of the machine is provided with special characters for printing signs opposite certain results, the mechanism for controlling this bar being explained in detail in the parent application.

It will be observed that this operating section constitutes an individual unit to which other units may be connected. The actuator segments are located so that they project slightly to the rear of the unit to be in position to cooperate with the totalizer pinions of different totalizer units that are connected to the rear of the main section. Also the stop bars are positioned so as to cooperate with the keys of the keyboard section which is placed on top of the main unit. The actuating means for operating the mechanism of other units, that is, the cam roller 290 is positioned where it may cooperate with a unit attached to the rear of the main unit.

Keyboard section

The keyboard section is an individual unit having top and bottom plates 159 and 160 separated by spacing plates 170. The rear ends 170ª of the latter project downwardly and are provided with openings to receive screws (Fig. 5) for attaching the rear end of the keyboard to the ends of the cross shaft 142. The forward ends of the spacing plates 170 support a shaft 122 on which are mounted a plurality of zero stop members 196—197, and a safety control device including a rod 191 and an arm 193. These parts and their operation are described in detail in the co-pending parent application. It is sufficient for the purposes of the present application to explain that these parts are carried by the keyboard section and positioned so that when this section is placed on top of the main section the parts are in position to cooperate and function with the proper parts of the main section without requiring any interconnection of the parts.

The keyboard is provided with a plurality of banks of manipulative amount keys which project through the top and bottom plates. Cooperating with the banks of keys are latch plates 180 having latching projections 186, the front ends of the plates being connected to the zero stops 196. When one of the keys is depressed it stretches a coil spring 184 on the bottom of the keyboard which then tends to return the key to its normal, undepressed position, the key being latched in depressed position by its latch plate in a manner described in detail in the co-pending parent application.

Two of the spacing plates 170 have downwardly projecting hook-shaped members 172 near their front end adapted to hook over studs 173 on the side plates of the main section. The keyboard section is attached to the main section by simply placing it on top of the main section, sliding it down to hook the hooks 172 over the studs 173 and then placing screws through the openings in the projections 170ª to hold the rear end of the keyboard section in place. The key stems are thus automatically located relative to the stop bars, the zero stops are in proper position and the safety control device is in its correct position.

Keyboard sections having different numbers of banks of keys and provisions for different control devices may be easily substituted for other keyboards by simply removing one and putting the other in its place. The keyboard is made as universal as possible, however, so that changes are infrequent even though the functions of the machine may be changed. For example, the keyboards are provided with a slot for the subtraction lever 226 shown in Fig. 8, even though said lever is not used in all cases, but, with the slot provided, it is not necessary to change the keyboard when the lever is used.

Printing section

A printing hammer section is mounted on top of the side plates 51 and 52 of the main section with the printing hammers cooperating with the type bars 264 carried by the actuators on the main section.

This section has a flat metal base plate 56 (Fig. 4) provided with downwardly projecting lugs 56ª by means of which it is connected to the side plates 51 and 52 of the main section. Mounted on a shaft 271 are a plurality of printing hammers 270 normally urged in a clockwise direction by springs 273. The upper ends of the hammers are guided by a comb plate 272 comprising a U-shaped plate attached to the base plate 56. The lower ends of the hammers extend downwardly at an angle and are provided with offset lugs 277 that cooperate with projections on the firing latches. The manner in which these parts operate is described in detail in my co-pending application referred to.

Figure 5:
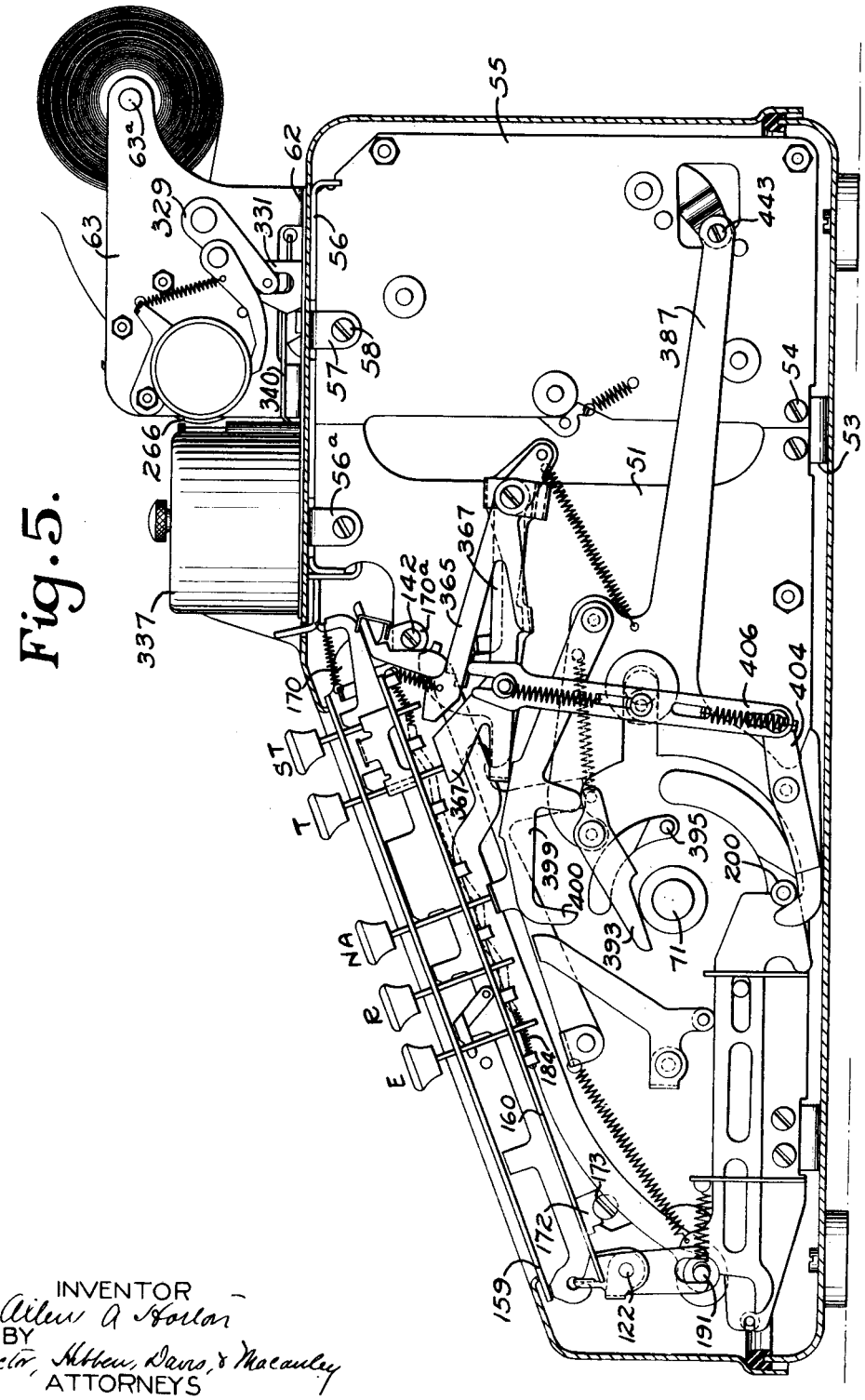
Fig. 5 is a side elevation showing the sections connected together and enclosed in the casing.

The base plate 56 is also provided with downwardly extending lugs 57 and screws 58 for connecting the printing section to the totalizer section as illustrated in Fig. 5. The printing section thus serves to connect the main section and the totalizer section and to aid in holding them together. It may be disconnected from either and left attached to the other.

Paper and ribbon feeding section

Figure 1:
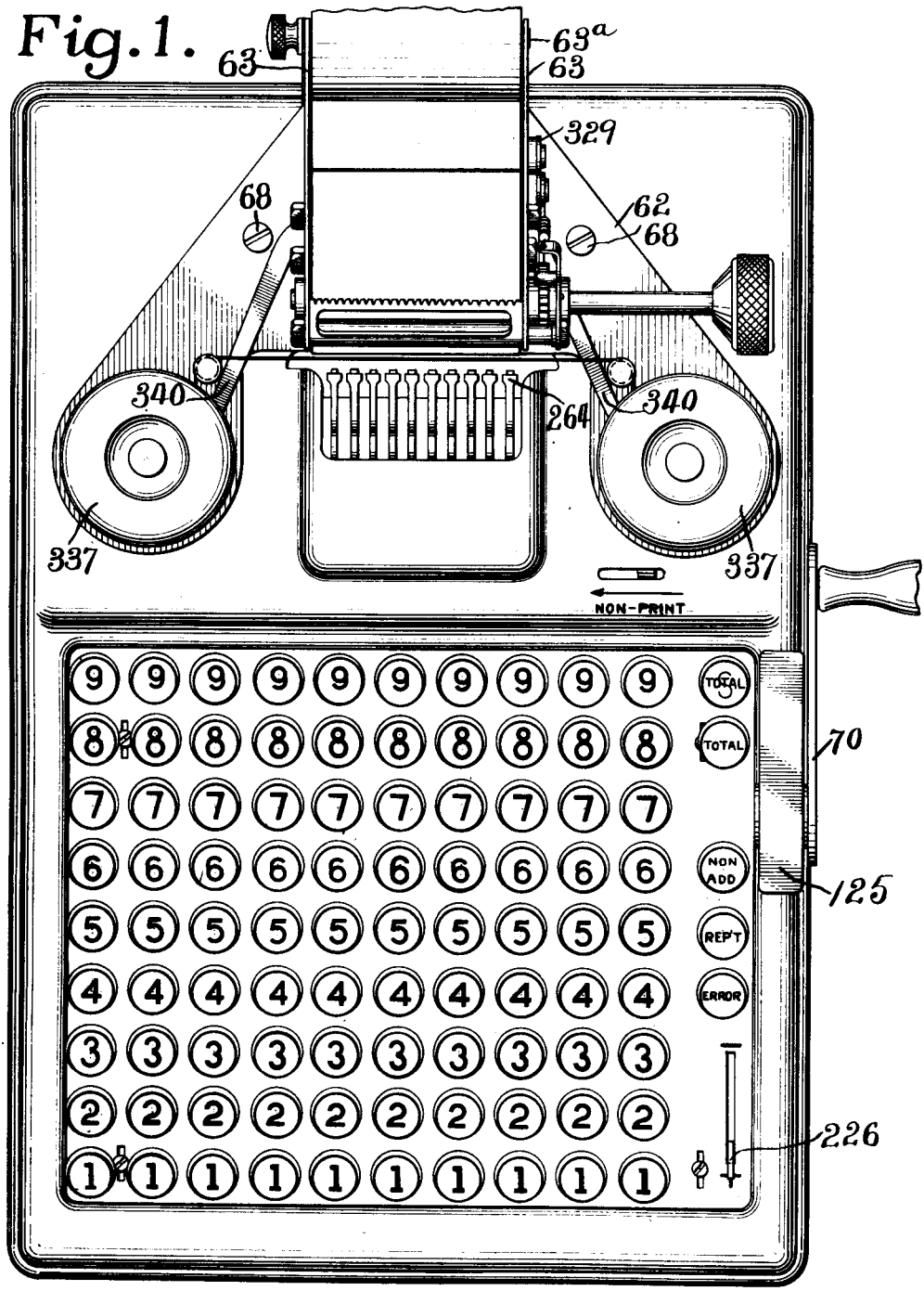
Fig. 1 is a top plan view of the machine.

The paper and ribbon feeding mechanisms are embodied in an independent unit which may be readily attached to and detached from the top of the main unit. It has been found most convenient to place this section on top of and on the outside of the casing as shown in Fig. 1. The paper and ribbon feeding mechanisms are associated so that they may be actuated by a single member and this member is positioned so that when the paper and ribbon feeding unit is mounted on the machine, the means for actuating the mechanism is in position to operate without further connection of parts.

This section is carried by a base plate 62 and two side plates 63 in which is mounted a platen 266 provided with suitable operating mechanism and adjustments described in detail in said parent application. The section also has two ribbon reels 336, covered by casings 337, an automatic ribbon reverse mechanism whose two arms 340 are illustrated in Fig. 1, and a shaft 63ª for receiving a paper roll. The ribbon feeding and reverse and the platen feeding mechanisms are actuated by an arm 329 (Fig. 5) having a roller on its end adapted to enter a slot in the end of an actuating member 331 carried by the totalizer section (Fig. 4).

The paper and ribbon feeding section thus constitutes an individual unit which is self-contained and which is the same for all types of machines. It may be quickly placed in position on top of the machine where it is held in position by two screws 68 illustrated in Fig. 1. The act of placing it in position on top of the casing positions its operating arm 329 in engagement with the actuating member 331 whose upper end extends through the casing, and no complicated connection of parts is required.

Totalizer section—Addition

Figure 4:
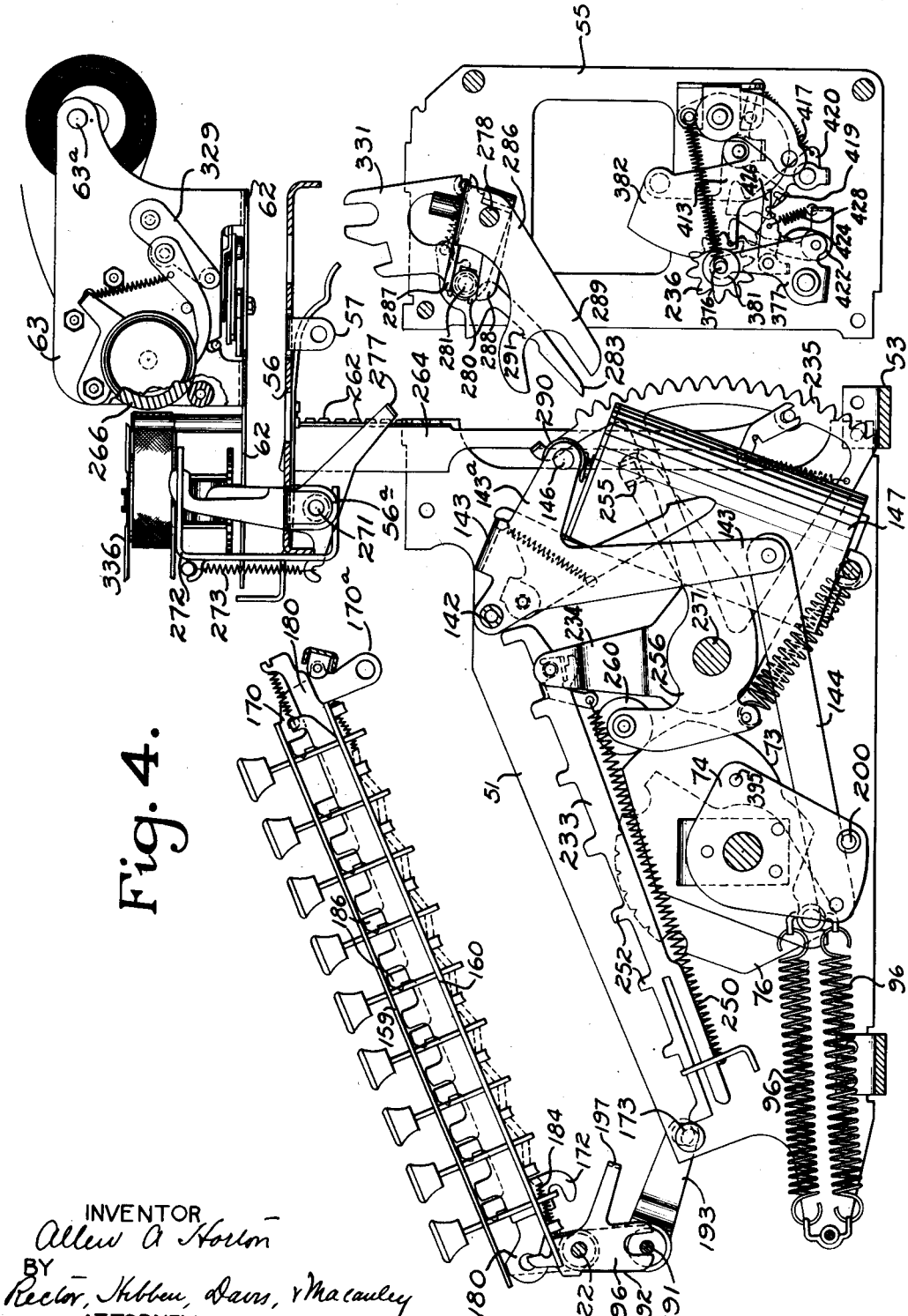
Fig. 4 is a side elevation and section of the different sections of the machine showing them separated but adjacent one another in position to be connected together to make a complete machine.

A totalizer section, capable of addition in a single counter, is illustrated in Fig. 4. It is provided with two side plates 55 which form extensions of the side plates 51 and 52 of the main section when the totalizer section is connected to the latter. The totalizer section thus forms an extension of the main section and part of the main frame of the complete machine. Its side plates are spaced the same distance apart as the side plates of the main section.

This section includes a totalizer comprising a plurality of pinions 236 mounted on a shaft 376 carried by movable arms 377. The shaft 376 has a cam roller 381 on its end adapted to be engaged by the edge of a cam 382 which is oscillated by a pitman 387 (Fig. 5) to rock the totalizer into and out of engagement with the actuator racks.

A transfer mechanism for carrying from a pinion of low order to a pinion of higher order is mounted at the rear of the totalizer so as to make the totalizer section a self-contained unit which will register items when actuated by the actuator racks. Briefly, it includes a plurality of transfer segments 413 normally urged clockwise by springs 417. The segments are held against movement by detents 420 having shoulders engaging lugs 419 on the segments. Pivoted on a shaft carried by the side arms 377 of the totalizer are tripping pawls 422 having noses adapted to be engaged by transfer projections carried by the totalizer pinions. When one of the totalizer pinions passes from "9" to "0" its transfer projection cams its trip pawl 422 rearward in which position it is latched by a latch 426 normally urged clockwise by a spring 428 and having a shoulder engaging behind a lug 424 on the trip pawl. This action takes place while the totalizer is forward in engagement with the actuator racks. As the totalizer is rocked rearward out of engagement with the actuators, the tripped pawls 422 engage their detents 420 and raise them to release the carry segments to permit them to move to effect a carry. The details of the transfer mechanism and a more complete description of its operation is contained in said co-pending parent application.

A means for operating the printing mechanism and for transferring motion for actuating the paper and ribbon feeding unit is also carried by this section. This comprises a yoke 286 (Fig. 2) mounted on a cross shaft 278 supported by the side plates 55 of the section. This yoke has a forwardly and downwardly extending arm 289 which is bifurcated to receive the roller 290 extending to the rear of the main section, the parts being located so that when the totalizer section is placed against the main section the arm 289 automatically straddles the roller. The yoke 286 has another arm 288 extending under the end of a shaft 281 (Fig. 4) as well as a lateral arm 287 extending over the end of said shaft. The shaft 281 is mounted in the arms 280 of a yoke pivoted on shaft 278 and said shaft 281 carries a plurality of firing latches 283 having projections 291 for engaging the lugs 277 on the printing hammers as will be clear from Fig. 11. When the yoke 286 is rocked by the roller 290 it rocks the shaft 281 and moves the firing latches to fire the printing hammers, the action being described in detail in the co-pending application heretofore mentioned.

The right hand arm 280 of the yoke 279 (Fig. 2) has an upward extension 331 which projects above the top of the totalizer section and is bifurcated to receive the roller on the end of the arm 329 which actuates the paper and ribbon feeding mechanisms. When the yoke 286 is rocked the arm 331 is oscillated to actuate the paper and ribbon feeding mechanisms.

It will be observed that the parts are so arranged that when the totalizer section is placed against the rear of the main section, the totalizer is in proper operative position relative to the actuators, the arm 289 straddles the roller 290 on the main section, and the firing latches are in position relative to the hammers. The operating arm 331 is in such position that when the paper and ribbon feeding unit is placed on top of the machine the operating arm cooperates with the mechanism of the latter unit to operate it.

*Motor section*

Although the machine may be operated by hand, it is often convenient to operate it by power, but since the machine is a small, compact, portable one, it is not desirable to increase the size of it to make it power driven or to locate the motor where it would interfere with setting the machine on a desk or table.

The sections heretofore described, with the exception of the paper and ribbon section, are all enclosed within narrowly spaced side plates, as shown in Figs. 1, 2 and 5. The main portion of the machine is thus considerably narrower than the enclosing casing. The nine-bank keyboard extends over the left side of the body of the machine, some of the stop bars being located outside of the plate 51 and some of the arms 234 of the actuators extending through said plate as shown in Fig. 2. Since the casing is made slightly wider than the keyboard and of rectangular section, the above construction leaves a space under a portion of the keyboard at the left of the plate 51 and the totalizer section and within the casing for a motor 100 and its driving connections shown in Fig. 2. This motor is a separate unit that is attached to the side of the totalizer section by suitable screws. Its driving connections are attached to the outside of plate 51 of the main section. A detailed description of the parts and their operation is contained in said co-pending parent application.

The machine may be supplied with or without this motor section. A hand driven machine may be quickly converted into a motor driven machine by attaching the motor section to it.

*Assembly of sections for adding machine*

The different sections are shown separated but ready for assembly in Fig. 4. The order in which they are connected together may be varied, but the following is found desirable.

The main section or operating unit is, of course, the unit to which the other sections are connected and the assembly centers around it. The printing hammer section is positioned on top of this unit and connected in place with the hammers in proper relation to the type bars. The hammer section thus combines with the main section and, in one view of the machine, the main section may be considered as including the printing hammer section, although, the latter is detachable from it.

The keyboard section may then be attached by simply placing it on top of the main section and sliding it slightly forward and down and then inserting two screws to hold it in place. The assembled sections then include the main operating mechanism, the printing mechanism and the keyboard.

The totalizer section is then placed against the main section. It is held in place at the top by the lugs on the printing section and at the bottom by the cross bar or foot 53 and screws 54 which support the rear of the machine. It is not necessary to connect the various mechanisms as they automatically come to proper connected position when the totalizer section is placed against the rear of the main section with the exception of the pitman 387 for rocking the totalizer which is connected to the totalizer by simply slipping it over a stud and inserting a screw to hold it in place (Fig. 5). The casing is then put on as it has been found desirable to have the paper and ribbon feeding unit on top of it. After the casing has been placed in position the paper and ribbon feeding unit is put on top of it and held in place by two screws 68. No connection of mechanism is required for this unit as the operating member 329 automatically positions itself relative to the member 331.

The connected position of the parts is illustrated in Fig. 5 where all the sections are connected together to make an adding machine. Briefly the operation is as follows:

Assume that the proper amount keys have been depressed and the handle given a forward stroke of movement. As the handle moves forward the bail 255 is moved away from the actuators which then move to differential positions along with their stop bars, said positions being determined by the engagement of the stop bars with the stems of the depressed amount keys. The stop bars and actuators for banks of keys in which no key has been depressed are prevented from moving by the zero stops 196—197 which automatically move in front of the stop bars for said banks as the handle moves. The type bars connected to the actuators are thus differently positioned and at the end of the forward stroke the firing latches 283 release the printing hammers which thereupon strike the type bars and print the amount that has been set up in the machine. During the forward stroke the stud 395 on the driving disk 74 has moved counter-clockwise past the shoulder on the pawl 393 (Fig. 5) on the pitman 387 and at the beginning of the return stroke this stud engages the shoulder on said pawl and moves the pitman rearwardly to rock the totalizer into engagement with the actuator racks. Also during the return stroke the bail 255 returns the actuators to normal and the amount is transferred to the totalizer. At the end of the return stroke the stud 200 on the driving disk 74 engages the hooked end of the pitman 387 and moves it forward to rock the totalizer out of engagement with the actuators whereupon the machine is ready for another operation. During the above operation the oscillation of the member 331—329 has line-spaced the paper and fed the ribbon one step from one spool to the other.

In taking a total or sub-total the control keys T or ST are depressed. The effect of depressing the total key is to move the pivoted arm 367 (Fig. 5) downward and through the connection 406 to move the pawl 404 on the pitman 387 into the path of the stud 200. Accordingly, at the beginning of the forward stroke the pitman 387 is moved rearwardly and the totalizer is moved into engagement with the actuators which thereupon move all the pinions to "0" position. Depression of the total key also moves the arm 399 downward which throws pawl 393 out of the path of the stud 395 and moves the hooked end of member 399 into its path. At the end of the forward stroke the stud 395 strikes the hooked end 400 of the member 399 on pitman 387 and moves the pitman forwardly to rock the cleared totalizer out of engagement with the actuators. Since the pawl 393 is out of the path of the stud 395, the pitman will not be moved rearwardly again upon the return stroke.

Depression of the sub-total key does not move the member 399 downwardly and hence the pitman 387 is not moved forward at the end of the forward stroke. Instead the pitman remains in the position to which it was moved at the beginning of the forward stroke, i. e., with the totalizer in engagement with the actuators. The parts remain in this condition during the first part of the return stroke. The pawl 393 is active but since the pitman is already in its rearmost position, the stud 395 cannot act on the pawl. Near the end of the return stroke the stud 200 engages the hooked end of the lower arm of the pitman to move it forwardly to rock the totalizer out of engagement with the actuators.

*Changing adding machine to subtractor*

Figure 6:
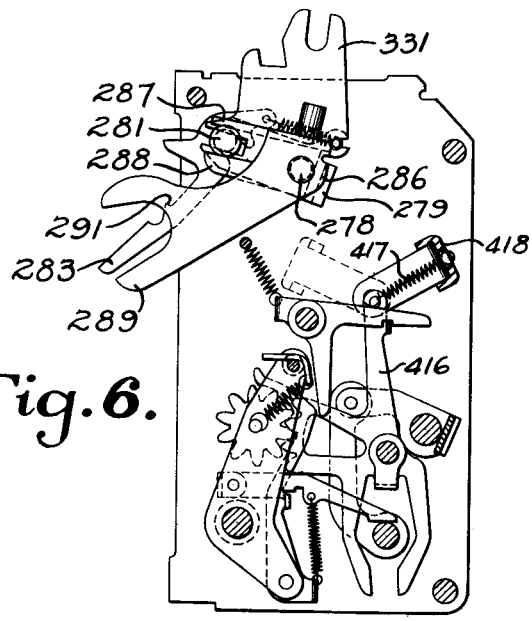
Fig. 6 is a side elevation and section of the subtraction totalizer unit that is substituted to convert the machine into a subtractor.
Figure 7:
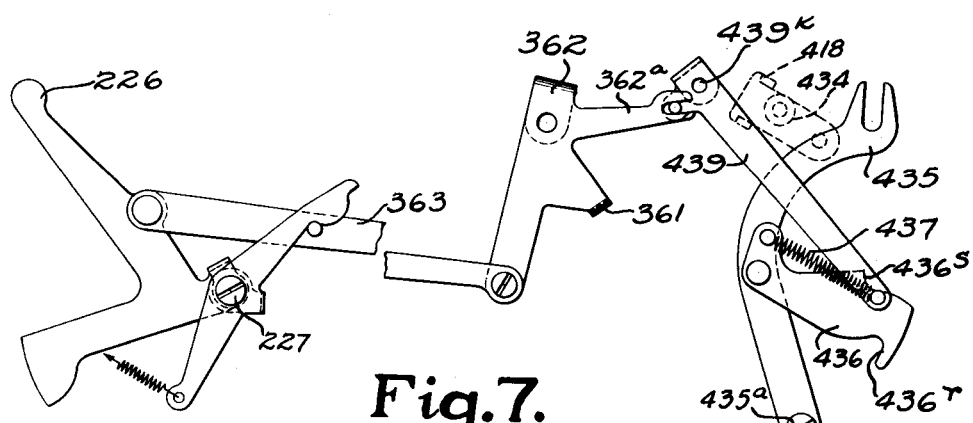
Fig. 7 is a side elevation of the subtraction controls that are added when the machine is converted into a subtractor.

In order to convert the machine into one that will subtract as well as add, it is merely necessary to substitute the totalizer section illustrated in Fig. 6 and to add a few of the controls shown in Fig. 7.

The main operating unit and the paper and ribbon feeding unit remain the same in each case and the keyboard need not be changed provided it has a slot for the subtraction control lever which is usually the case. If it does not have such a slot, a keyboard with a slot is substituted.

To change the machine, the paper and ribbon unit is removed, then the casing and then the base plate, after which the addition totalizer section is disconnected. These operations merely require taking out a few screws that hold the parts together, it not being necessary to disconnect the mechanisms of the sections from one another with the exception of the pitman 387 whose one screw 443 is removed to disconnect it from the totalizer operating means. The subtraction totalizer section illustrated in Fig. 6 is then placed against the main section, the printing section replaced and the screws re-inserted to hold the parts together. Only the controls 226, 363 and 362 of Figs. 7 and 8 with the latch for 363 are added and it will be noted that these are mounted on the outside of the machine where they can be readily handled and they are mounted on the same studs 227 and 359 that carry the addition controls. None of the addition controls are taken off. The few subtraction controls are simply added, it being pointed out that the controls 439, 436, etc., are carried by the subtraction totalizer section. The casing is then put on and the ribbon and paper unit again attached to the top. The machine is then ready to subtract as well as add.

The subtraction totalizer section is a self-contained unit similar in size and construction to the addition totalizer section and the totalizer itself is approximately the same, the main difference in the two sections being in the transfer mechanism which, in the subtraction totalizer section, is constructed so that it will borrow as well as carry. The details of the transfer mechanism will not be described herein as the same are fully explained in said co-pending application, Serial No. 84,616. It is sufficient for the purposes of the present case to explain that the transfer mechanism includes transfer segments 416 which are moved in one direction to effect a carry and in the opposite direction to effect a borrow. The direction in which they are moved depends upon the direction of action of the springs 417 which are connected to them. The direction of action of these springs may be changed by swinging the bail 418 from the full line position of Fig. 6 to the dotted line position of Fig. 7. This change is automatically effected when the machine is operated after it has been set to change its function from addition to subtraction or vice versa.

The subtraction controls are for the purpose of conditioning the machine for either addition or subtraction. When the subtraction controls are in the addition position illustrated in Fig. 8, the machine operates as a straight adding machine in the same manner as heretofore described. In order to condition the machine for subtraction, the control lever 226 is thrown rearwardly, which results in two things,—namely, the transfer mechanism is conditioned to be set for borrowing instead of carrying, and the controls for the pitman that rock the totalizer into and out of engagement with the actuators are changed so that instead of the totalizer being rocked into engagement with the actuators at the beginning of the return stroke, it is rocked into engagement with the actuators at the beginning of the forward stroke and out of engagement at the end thereof so that the totalizer pinions are rotated in the opposite directions by the initial movement of the actuators to thus subtract the number that has been inserted in the machine from whatever amount was registered in the totalizer.

The construction of the machine makes it possible to use a subtraction control comprising only three main parts on the main operating unit and these can be easily mounted on studs already on the machine. They include a subtraction control lever 226 adapted to be pivoted on the stud 227 (Figs. 1 and 8) and connected by a link 363 to a yoke member 362 pivoted on the stud 359 (Figs. 1 and 8) and having a rearwardly extending arm 362$^a$ whose slotted end engages over a stud on an arm 439 carried by the subtraction totalizer section and pivoted on the stud 439$^k$. A spring 437 is connected to the other end of this arm and the other end of the spring is connected to the arm of a plate 436 pivoted on an arm 435 which, in turn, is pivoted on a stud 435$^a$ on the plate 55. The free end of the arm 435 has a slot engaging over the stud 434 carried by the bail 418. The plate 436 has shoulders 436$^r$ and 436$^s$ for engagement respectively by the stud 443 to which the pitman 387 is connected and the stud 440 carried by the cam plate 382 that rocks the totalizer.

Figure 8:
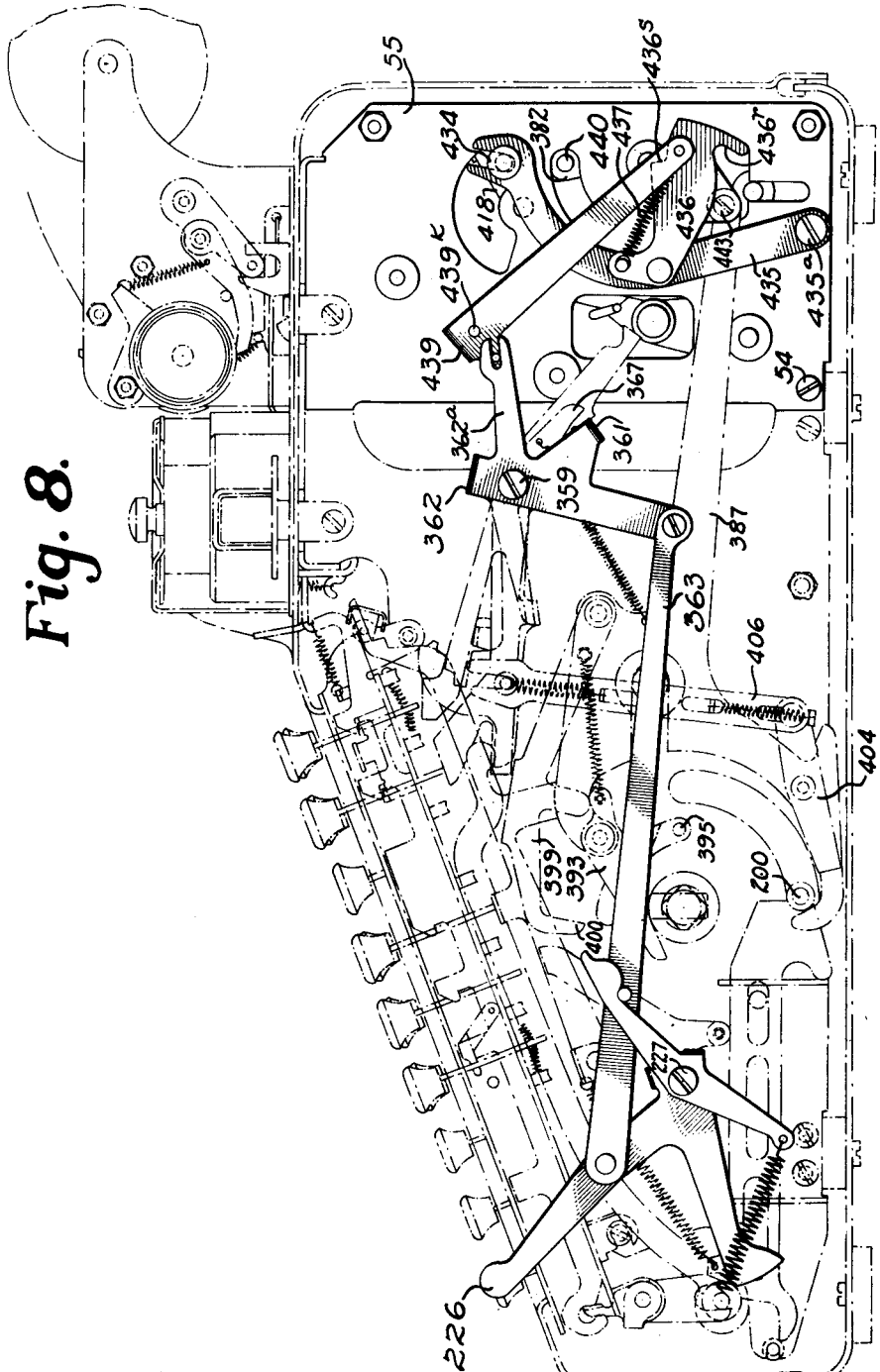
Fig. 8 is a side elevation of the machine in dotted lines showing the totalizer section of Fig. 6 connected in position.

The operation of these controls is briefly as follows:

When the control lever is in the position shown in Fig. 8 the machine is in addition condition. To condition the machine for subtraction, the lever 226 is moved to the rear which thrusts the link 363 rearwardly and moves the yoke 362 counter-clockwise. A lug 361 on a rearwardly extending arm of this yoke strikes the end of the arm 367 and moves it counter-clockwise, which movement, through the connection 406, raises the pawl 404 on the pitman 387 up into the path of the stud 200. Accordingly, at the beginning of the forward stroke, the stud 200 strikes the pawl 404 and moves the pitman 387 rearwardly to rock the totalizer into engagement with the actuator. The counter-clockwise movement of the arm 367 moves the arm 399 downwardly and the central projection on this arm engages the pawl 393 to move it to inactive position. At the same time the hooked end of the member 399 moves into the path of the stud 395 so that at the end of the forward stroke of the machine, the stud 395 strikes the hooked end 400 of the member 399 which is pivoted to the pitman 387 and the pitman is moved forwardly to rock the totalizer out of engagement with the actuators at the end of the forward stroke. The totalizer then remains out of engagement with the racks because, during the return stroke, the stud 395 cannot strike the pawl 393 owing to the fact that is held out of the path of the stud by the central projection on the member 399.

When the subtraction control lever is moved to the rear from the position shown in Fig. 8, the counter-clockwise rocking of yoke 362 moves the lever 439 clockwise to swing the spring 437 past the pivot of the member 436. The spring will thereupon swing the member 436 in a counter-clockwise direction until its shoulder 436$^s$ is in the path of the stud 440. At the beginning of the forward stroke of the machine, the pitman 387 will move to the rear which will rock the plate 382 carrying stud 440 forwardly and the engagement of this stud with the shoulder 436$^s$ on the member 436 will swing the arm 435 to rock the bail 418 from the addition position shown in Fig. 8, to the subtraction position shown in dotted lines in Fig. 6.

To change the machine from subtraction condition to addition, the control lever 226 is pulled forward which rocks the yoke 362 clockwise and permits the members 367, 404 and 399 to return to normal position as illustrated in Fig. 5. The lever 439 is moved counter-clockwise to the Fig. 8 position which swings the plate 436 into position such that when the pitman 387 moves rearwardly the stud 443 strikes the shoulder 436$^r$ and moves the lever 435 to throw the bail 418 from the subtraction position shown in dotted lines in Fig. 6 to the addition position shown in full lines.

It will be understood that the subtraction machine may be converted into one that will add only by removing the subtraction controls and the subtraction totalizer section and substituting an addition totalizer section.

*Conversion into multiple counter machine*

Figure 9:
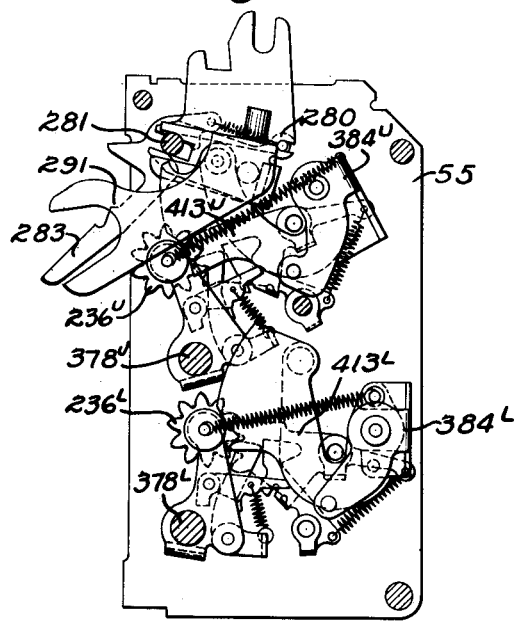
Fig. 9 is a side elevation of a duplex totalizer section that may be used in the machine to convert it into a multiple counter machine.

A machine capable of addition only or one capable of both addition and subtraction may be quickly converted into one having multiple counters by substituting the totalizer section illustrated in Fig. 9 for whatever totalizer section is on the machine. This duplex totalizer section is of the same general character as the other totalizer sections, being carried by two spaced side plates that form extensions of the main section when the totalizer section is placed in assembled position. These plates carry two separate totalizers each of which has its own transfer mechanism and each of which is adapted to independently engage the actuator racks on the main section. This section also carries the necessary firing latches for the printing mechanism, and the operating devices which operate the printing mechanism and the paper and ribbon feeding unit.

The two totalizers and their transfer mechanisms are substantially like the single totalizer for the straight adder and need not be described in detail, reference being made to the prior description and to the co-pending parent application.

Figure 10:
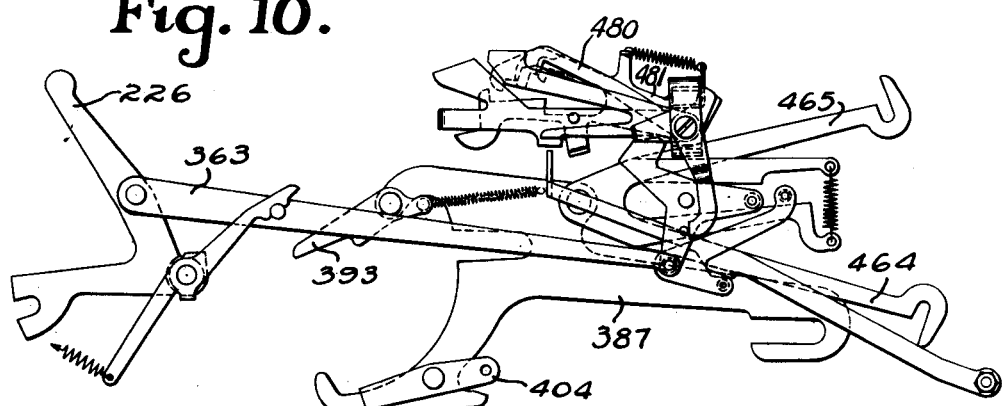
Fig. 10 is a side elevation of the duplex controls that are connected on the outside of the machine when the duplex totalizer section is used.

Inasmuch as two totalizers are present in the duplex section, different controls are required in order to move the totalizers into and out of engagement with the racks in the proper sequence. These controls are illustrated in Fig. 10. They include a differently shaped pitman 387, a control lever 226, and two hook shaped members 464 and 465 adapted to be moved into and out of engagement with studs $466^L$ and $466^U$ on the lower and upper totalizers respectively. It is also desirable to print special characters in connection with taking totals on the different totalizers and for this purpose, a series of specially shaped levers 480, 481, etc. are used for positioning the special character printing type bars. All these are illustrated in Fig. 10 and the manner in which they operate is described in detail in said parent application. The operation, as far as controlling the totalizers is concerned, is briefly as follows:

The control lever 226 renders either or both the lower and the upper totalizers active. When the control lever is in the intermediate position shown in Fig. 12, both totalizers are active and reciprocation of the pitman 387 will move both of them into and out of engagement with the racks in the same manner as for straight addition.

When the control lever 226 is moved rearwardly from the position of Fig. 12, the upper totalizer is rendered active and the lower totalizer becomes inactive. Under these conditions, reciprocation of the pitman 387 moves the upper totalizer into and out of engagement with the actuator racks but leaves the lower totalizer idle.

When the control lever 226 is moved forward from the position of Fig. 12, the lower totalizer is rendered active and the upper inactive.

The duplex controls are constructed so that they may be mounted upon the same studs as the other control levers with the result that the mounting of them on the outside of the main section is a simple matter. It is only necessary to remove the subtraction controls, if the machine has been a subtraction machine, and substitute the controls illustrated in Fig. 10. If the machine is a straight adder, it is merely necessary to add the control illustrated in Fig. 10. The parts go into position easily and may be connected up without difficulty.

It will, of course, be understood that a duplex machine may be converted into one that will subtract by removing the duplex controls and the duplex totalizer section and substituting a substraction totalizer section with subtraction controls. Likewise, a duplex machine may be converted into a straight adding machine by removing the duplex controls and the duplex totalizer section and substituting a single counter, addition, totalizer section.

Some of the advantages of the machine are:

From a manufacturing standpoint the construction reduces the cost and speeds production. The parts themselves have been made simple and the fact that different types of machines use the same parts except for certain sections greatly reduces the total number of parts for a wide variety of machines. The assembly in sections promotes rapid work as one part of the machine need not wait on another and each worker need not handle the whole machine. Costs are also reduced in the matter of stocking parts and in filling orders, as it is not necessary to build a large number of complete machines of different types. The different sections can be built and, as orders are received, the proper sections may be quickly connected together to make up whatever type of machine is desired.

From the standpoint of the user the machine is more economical, first, because it costs less on account of the reduced manufacturing cost. Second, it serves him better in that, should he desire to change his type of machine, be can do so by changing a section without incurring the expense of buying a complete machine.

Considered as a whole, a small, inexpensive, compact, light, portable calculating machine has been produced which can be made at a smaller cost than those heretofore produced and which is of more value to the public in that it is more flexible and can be changed from one type to another without, in every case, buying a new machine.

It is to be understood that the construction shown is for purposes of illustration and that variations may be made in it within the spirit and scope of the invention as defined by the claims.

I claim:

1. A calculating machine having a main section carrying the main operating means of the machine and including a printing mechanism, an independent totalizer section including a totalizer with transfer mechanism therefor, said totalizer section being attachable to and detachable from the main section as a unit, and a third detachable section carrying hammers for the printing mechanism, said third section serving to connect the first two sections together.

2. A calculating machine having a main section comprising an independent unit including differential mechanism and an operating means, a detachable totalizer section including a totalizer with transfer mechanism therefor, said totalizer section also including a member operated by the operating means of the main section, and a detachable paper and ribbon section including paper feeding and ribbon feeding mechanisms operated by the operating member of the totalizer section.

3. A convertible calculating machine comprising a main operating section constituting an independent unit to which a variety of independent self-contained sections may be selectively attached to combine with the main section to make up a calculating machine capable of performing different functions, said main section including operating means, a plural order differential mechanism and a plurality of actuator racks, and said attachable sections including totalizers having plural pinions adapted to engage said racks, transfer mechanism, and controlling connections, said main section also having means for interchangeably receiving the controlling connections of said sections.

4. A convertible calculating machine comprising a main operating section constituting an independent unit to which addition and subtraction sections may be selectively attached to combine with the main section to make up a calculating machine that will add or one that will add and subtract, said main section including operating means, a plural order differential mechanism, and a plurality of actuator racks, said addition and subtraction sections each having a totalizer provided with plural pinions adapted to engage said racks, transfer mechanism, and controlling connections, said main section also being provided with means for interchangeably receiving the controlling connections for both said addition and said subtraction sections.

5. A convertible calculating machine comprising a main operating section constituting an independent unit to which single totalizer and duplex totalizer sections may be selectively attached to combine with the main section to make up a calculating machine capable of performing different functions, said main section including operating means, a plural order differential mechanism and a plurality of actuator racks, said attachable sections including totalizers having plural pinions adapted to engage said racks, transfer mechanism therefor, and controlling connections, said main section also being provided with means for interchangeably receiving the controlling connections of said attachable section.

In testimony whereof, I have subscribed my name.

ALLEN A. HORTON.